(12) United States Patent
Chen et al.

(10) Patent No.: US 11,112,913 B2
(45) Date of Patent: Sep. 7, 2021

(54) TOUCH SCREEN, MANUFACTURING METHOD THEREOF, TOUCH DISPLAY PANEL, AND DISPLAY DEVICE

(71) Applicants: BOE Technology Group Co., Ltd., Beijing (CN); Hefei BOE Optoelectronics Technology Co., Ltd., Hefei (CN)

(72) Inventors: Tong Chen, Beijing (CN); Xiaoming Meng, Beijing (CN)

(73) Assignees: BOE Technology Group Co., Ltd., Beijing (CN); Hefei BOE Optoelectronics Technology Co., Ltd., Hefei (CN)

( * ) Notice: Subject to any disclaimer, the term of this patent is extended or adjusted under 35 U.S.C. 154(b) by 0 days.

(21) Appl. No.: 16/192,468

(22) Filed: Nov. 15, 2018

(65) Prior Publication Data
US 2019/0332201 A1    Oct. 31, 2019

(30) Foreign Application Priority Data
Apr. 28, 2018  (CN) .......................... 201810398971.4

(51) Int. Cl.
*G06F 3/044*    (2006.01)
(52) U.S. Cl.
CPC .... *G06F 3/044* (2013.01); *G06F 2203/04103* (2013.01); *G06F 2203/04112* (2013.01)
(58) Field of Classification Search
CPC ........... G06F 3/044; G06F 2203/04112; G06F 3/0412; G06F 2203/04103; G06F 1/16; G06F 3/0448; G06F 3/0443; G06F 2203/04111; G06F 2203/04102; G02F 1/13338; G02F 1/1343; H01L 27/3223; H05K 1/0296; H05K 2201/09245
See application file for complete search history.

(56) References Cited

U.S. PATENT DOCUMENTS

| | | | | |
|---|---|---|---|---|
| 9,171,893 B2* | 10/2015 | Go | ............... | H01L 27/3258 |
| 9,639,221 B2* | 5/2017 | Chyan | ............... | G06F 3/044 |
| 9,645,694 B2* | 5/2017 | Iwami | ............... | G06F 3/041 |
| 9,778,801 B2* | 10/2017 | Jung | ............... | G06F 3/044 |
| 9,836,176 B1* | 12/2017 | Yoshiki | ............... | G06F 3/044 |
| 9,874,985 B2* | 1/2018 | Sohn | ............... | G06F 3/044 |
| 10,019,124 B2* | 7/2018 | Jung | ............... | G06F 3/044 |
| 10,025,444 B2* | 7/2018 | Kikukawa | ............... | G06F 3/047 |
| 10,055,832 B2* | 8/2018 | Iwami | ............... | G06T 7/0004 |
| 10,133,406 B2* | 11/2018 | Choi | ............... | G06F 3/044 |

(Continued)

*Primary Examiner* — Michael J Jansen, II
(74) *Attorney, Agent, or Firm* — Arent Fox LLP; Michael Fainberg

(57) ABSTRACT

A touch screen, a manufacturing method thereof, a touch display panel, and a display device are provided. The touch screen includes: a base substrate, and a conductive layer over the base substrate, the conductive layer includes: touch electrodes having a metal mesh, and dummy patterns having a metal mesh, wherein the touch electrodes are insulated from the dummy patterns, and the metal mesh of each of the touch electrodes comprises a plurality of closed patterns; and each of the dummy patterns comprises at least one dummy sub-pattern, the at least one dummy sub-pattern are insulated from each other, and the metal mesh of each of the at least one dummy sub-pattern comprises at least one closed pattern.

7 Claims, 8 Drawing Sheets

(56) References Cited

U.S. PATENT DOCUMENTS

| | | | | |
|---|---|---|---|---|
| 10,191,590 B2* | 1/2019 | Kim | | G06F 3/044 |
| 10,222,917 B2* | 3/2019 | Sunada | | G06F 3/044 |
| 10,275,100 B2* | 4/2019 | Sunada | | G06F 3/044 |
| 10,324,575 B2* | 6/2019 | Hwang | | G06F 3/044 |
| 10,331,237 B2* | 6/2019 | Nakamura | | G06F 3/03545 |
| 10,338,008 B2* | 7/2019 | Iwami | | H01B 5/14 |
| 10,346,965 B2* | 7/2019 | Iwami | | H04N 9/083 |
| 10,372,278 B2* | 8/2019 | Ikeda | | H01L 27/3276 |
| 10,379,691 B2* | 8/2019 | Sunada | | G06F 3/0448 |
| 10,395,354 B2* | 8/2019 | Iwami | | G06T 7/0004 |
| 10,402,021 B2* | 9/2019 | Lee | | G06F 3/044 |
| 10,474,295 B2* | 11/2019 | Kim | | G06F 3/0418 |
| 10,475,175 B2* | 11/2019 | Yamaguchi | | G06F 3/044 |
| 10,551,974 B2* | 2/2020 | Lee | | G06F 3/044 |
| 10,558,312 B2* | 2/2020 | Sakaue | | G06F 3/0445 |
| 10,620,732 B2* | 4/2020 | Oh | | G06F 3/0412 |
| 10,698,513 B2* | 6/2020 | Na | | G06F 3/0448 |
| 10,725,603 B2* | 7/2020 | Sakaue | | H05K 3/1275 |
| 10,732,762 B2* | 8/2020 | Na | | G06F 3/0416 |
| 10,915,206 B2* | 2/2021 | Moon | | G09G 3/2003 |
| 2010/0045625 A1* | 2/2010 | Yang | | G06F 3/044 |
| | | | | 345/173 |
| 2014/0054070 A1* | 2/2014 | Ichiki | | G06F 3/044 |
| | | | | 174/253 |
| 2015/0179720 A1* | 6/2015 | Go | | H01L 27/3258 |
| | | | | 257/40 |
| 2015/0212537 A1* | 7/2015 | Cok | | G06F 3/046 |
| | | | | 345/174 |
| 2015/0212613 A1* | 7/2015 | Fowlkes | | G06F 3/046 |
| | | | | 345/173 |
| 2015/0220181 A1* | 8/2015 | Jung | | G06F 3/0412 |
| | | | | 345/174 |
| 2015/0286323 A1* | 10/2015 | Iwami | | G06F 3/041 |
| | | | | 345/174 |
| 2016/0085339 A1* | 3/2016 | Yashiro | | G06F 3/044 |
| | | | | 345/174 |
| 2016/0091998 A1* | 3/2016 | Chyan | | G06F 3/041 |
| | | | | 345/174 |
| 2016/0103526 A1* | 4/2016 | Sohn | | G06F 3/044 |
| | | | | 345/174 |
| 2016/0202789 A1* | 7/2016 | Kim | | G06F 3/044 |
| | | | | 345/174 |
| 2017/0031482 A1* | 2/2017 | Yoshiki | | G06F 3/044 |
| 2017/0102342 A1* | 4/2017 | Iwami | | B32B 7/02 |
| 2017/0102804 A1* | 4/2017 | Kikukawa | | G06F 3/041 |
| 2017/0139504 A1* | 5/2017 | Sunada | | G06F 3/044 |
| 2017/0147133 A1* | 5/2017 | Choi | | G06F 3/044 |
| 2017/0153762 A1* | 6/2017 | Kim | | G06F 3/044 |
| 2017/0160870 A1* | 6/2017 | Lee | | G06F 3/044 |
| 2017/0177147 A1* | 6/2017 | Sakamoto | | G02F 1/13338 |
| 2017/0199594 A1* | 7/2017 | Lee | | G06F 3/044 |
| 2017/0200263 A1* | 7/2017 | Iwami | | G06F 3/041 |
| 2017/0221195 A1* | 8/2017 | Iwami | | G06F 3/044 |
| 2017/0221196 A1* | 8/2017 | Yamaguchi | | G06T 7/90 |
| 2017/0228052 A1* | 8/2017 | Nakamura | | G06F 3/03545 |
| 2017/0243342 A1* | 8/2017 | Iwami | | G06T 7/0004 |
| 2017/0262096 A1* | 9/2017 | Kim | | G06F 3/0416 |
| 2017/0322651 A1* | 11/2017 | Sunada | | G06F 3/044 |
| 2017/0344151 A1* | 11/2017 | Yoshiki | | G06F 3/044 |
| 2017/0357345 A1* | 12/2017 | Ikeda | | G06F 3/0412 |
| 2017/0364179 A1* | 12/2017 | Jung | | G06F 3/044 |
| 2018/0024689 A1* | 1/2018 | Yoshiki | | G06F 3/044 |
| | | | | 345/173 |
| 2018/0081219 A1* | 3/2018 | Kim | | G02F 1/133305 |
| 2018/0081464 A1* | 3/2018 | Sunada | | G06F 3/044 |
| 2018/0129352 A1* | 5/2018 | Kim | | G06F 3/0412 |
| 2018/0164931 A1* | 6/2018 | Na | | G06F 3/0412 |
| 2018/0348906 A1* | 12/2018 | Hwang | | G06F 3/044 |
| 2019/0050104 A1* | 2/2019 | Na | | G06F 3/0416 |
| 2019/0064980 A1* | 2/2019 | Oh | | G06F 3/0412 |
| 2019/0114006 A1* | 4/2019 | Sakaue | | G06F 3/044 |
| 2019/0138137 A1* | 5/2019 | Sakaue | | H05K 3/1275 |
| 2019/0179445 A1* | 6/2019 | Moon | | G06F 3/0412 |
| 2019/0294279 A1* | 9/2019 | Bani | | G06F 3/047 |

\* cited by examiner

TOUCH SCREEN, MANUFACTURING METHOD THEREOF, TOUCH DISPLAY PANEL, AND DISPLAY DEVICE

CROSS-REFERENCES TO RELATED APPLICATIONS

This application claims priority to Chinese patent application No. 201810398971.4 filed on Apr. 28, 2018, which is incorporated herein by reference in its entirety.

FIELD

The present disclosure relates to the field of display technologies, and particularly to a touch screen, a manufacturing method thereof, a touch display panel, and a display device.

BACKGROUND

The metal mesh touch screen has been widely applied due to its excellent electrical property. At present, during the manufacturing of the metal mesh in a lithography process, the metal mesh may suffer from non-uniform etching, thus result in optical non-uniformity and further optical shadow elimination.

SUMMARY

In an aspect, an embodiment of the disclosure provides a touch screen. The touch screen includes: a base substrate, and a conductive layer over the base substrate, wherein: the conductive layer includes: touch electrodes having a metal mesh, and dummy patterns having a metal mesh, wherein the touch electrodes are insulated from the dummy patterns, and the metal mesh of each of the touch electrodes includes a plurality of closed patterns; and each of the dummy patterns includes at least one dummy sub-pattern, the at least one dummy sub-pattern are insulated from each other, and the metal mesh of each of the at least one dummy sub-pattern includes at least one closed pattern.

In a possible implementation, in the touch screen above according to the embodiment of the disclosure, the metal mesh of each of the at least one dummy sub-pattern includes the same number of closed patterns.

In a possible implementation, in the touch screen above according to the embodiment of the disclosure, the metal mesh of each of the at least one dummy sub-pattern includes about one to three closed patterns.

In a possible implementation, in the touch screen above according to the embodiment of the disclosure, the metal mesh is disconnected at edges of the touch electrodes and the edges of the dummy patterns.

In a possible implementation, in the touch screen above according to the embodiment of the disclosure, the metal mesh is disconnected at edges of each of the at least one dummy sub-pattern.

In a possible implementation, in the touch screen above according to the embodiment of the disclosure, the conductive layer includes a first conductive layer located at a light incident side of the touch screen, and a second conductive layer located at a light emitting side of the touch screen, and an insulation layer is located between the first conductive layer and the second conductive layer; and the touch electrodes of the first conductive layer are touch driving electrodes extending in a first direction, and the touch electrodes of the second conductive layer are touch sensing electrodes extending in a second direction, wherein the first direction intersects with the second direction.

In a possible implementation, in the touch screen above according to the embodiment of the disclosure, an orthographic projection of the metal mesh of the first conductive layer, and an orthographic projection of the metal mesh of the second conductive layer onto the base substrate are offset from each other.

In a possible implementation, in the touch screen above according to the embodiment of the disclosure, orthographic projections of mesh points of the metal mesh of the first conductive layer, and orthographic projections of mesh points of the metal mesh of the second conductive layer onto the base substrate are offset from each other.

In a possible implementation, in the touch screen above according to the embodiment of the disclosure, the metal mesh of the first conductive layer, and the metal mesh of the second conductive layer are in the same shape, and of the same size.

In a possible implementation, in the touch screen above according to the embodiment of the disclosure, the conductive layer is a single layer; and the touch electrodes include touch sensing electrodes and touch driving electrodes, or the touch electrodes include self-capacitive electrodes.

In another aspect, an embodiment of the disclosure further provides a touch display panel. The touch display panel includes the display panel, and the touch screen according to any one of the embodiments above of the disclosure. The touch screen is located on the light emitting surface of the display panel.

In a possible implementation, in the touch display panel above according to the embodiment of the disclosure, the display panel is a light-emitting display panel or a liquid crystal display panel.

In another aspect, an embodiment of the disclosure further provides a display device including the touch display panel above according to the embodiment of the disclosure.

In another aspect, an embodiment of the disclosure further provides a method for manufacturing the touch screen above according to the embodiment of the disclosure. The method includes: forming the conductive layer and a photoresist layer successively on the base substrate; patterning the photoresist layer into a mask pattern; and etching the conductive layer shielded by the mask pattern to form the conductive layer having the metal mesh.

DETAILED DESCRIPTION

Figure 1A:
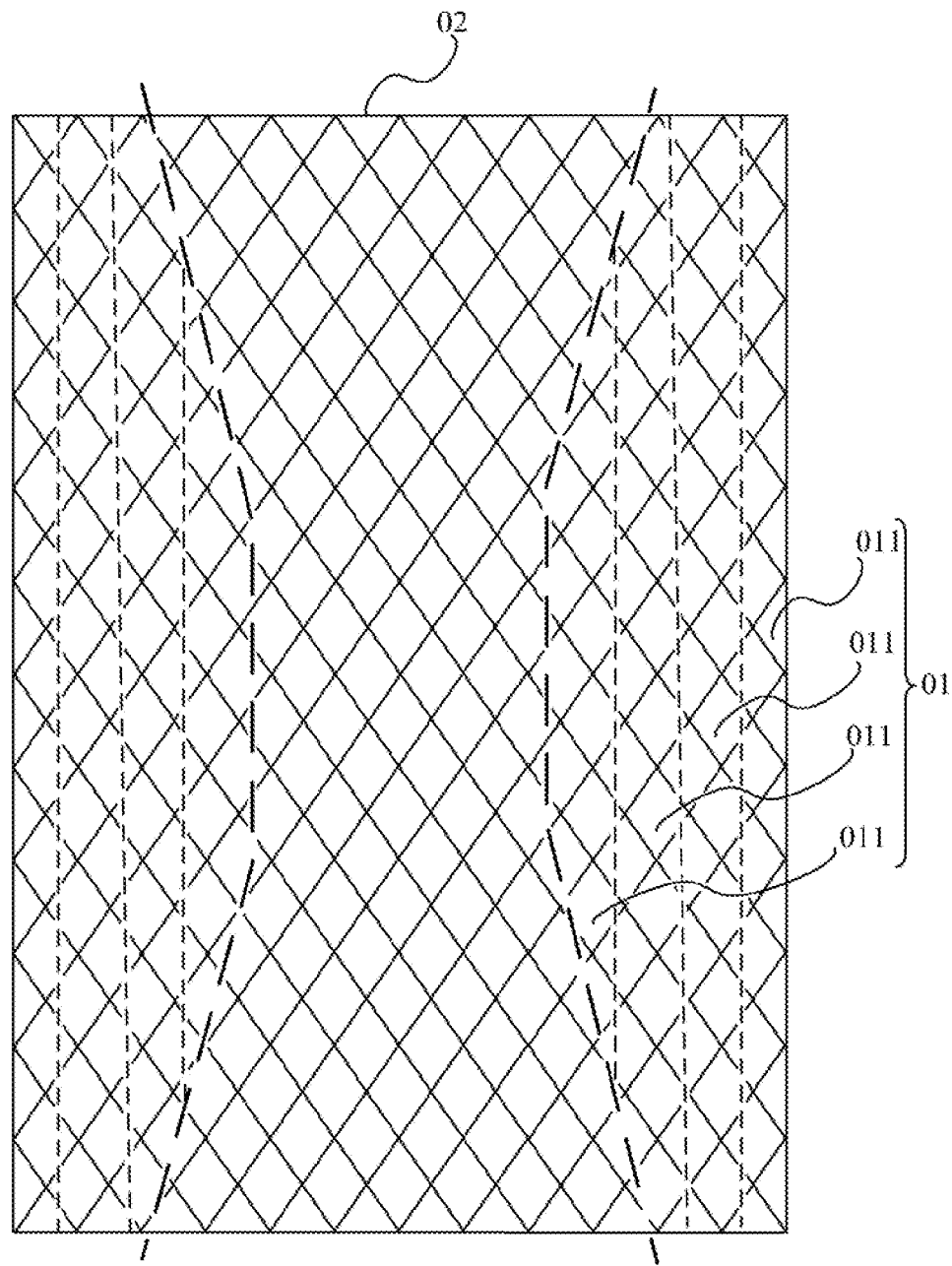
FIG. 1A is a schematic structural diagram of a touch screen in the related art.
Figure 1B:
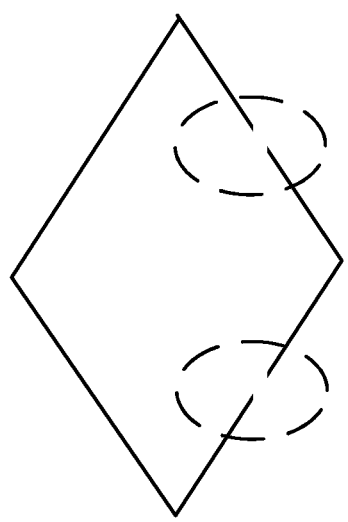
FIG. 1B is a schematic structural diagram of a mesh in a dummy pattern in the touch screen in the related art.

In related art, the metal mesh may suffer from non-uniform etching due to such a reason that: as illustrated in FIG. 1A, the metal mesh is patterned in such a design that the diamond meshes of all dummy sub-patterns 011 in dummy patterns 01 are disconnected, and the diamond mesh is disconnected as denoted in a dotted circle as illustrated in FIG. 1B, that is, the dummy sub-pattern 011 is not an integral closed pattern; and diamond meshes in touch electrodes 02 are integral closed patterns. The closed patterns can enable etchant to be held for a longer time, and the etchant in the disconnected diamond meshes tends to run off, so there are a long etching time for the meshes in the touch electrodes 02, and a short etching time for the meshes in the dummy patterns, thus resulting in a difference in line width, and thus a difference in optical effect, between the meshes in the touch electrodes 02 and the meshes in the dummy patterns 01, that is, there may be such a significant difference in optical reflectivity between two areas of the touch electrodes 02 and the dummy patterns 01 that may result in poor optical shadow elimination, and thus an optical spot.

The dummy patterns 01 refer to the metal mesh patterns formed together with the touch electrodes 02, the difference between them is that: the touch electrodes 02 are effective channels where the signal can be transmitted, whereas the dummy patterns are dummy where no signal can be transmitted. In optical aspect, the dummy patterns enable the whole metal mesh to be uniform, to avoid bright fringe resulting from no pattern in local region. In electrical aspect, the dummy patterns can adjust the mutual capacitance between nodes in the touch unit to an appropriate range.

In view of this, embodiments of the disclosure provide a touch screen, its manufacturing method, a touch display panel, and a display device so as to reduce a difference in etching between touch electrodes and dummy patterns to thereby reduce a difference in line width between their meshes, thus alleviating optical shadow elimination, and eliminating a spot.

In order to make the objects, technical solutions, and advantages of the disclosure more apparent, the disclosure will be described below in further details with reference to the drawings, and apparently the embodiments to be described are only a part but not all of the embodiments. Based upon the embodiments here of the disclosure, all the other embodiments which can occur to those ordinarily skilled in the art without any inventive effort shall fall into the claimed scope of the disclosure.

The shapes and sizes of respective components in the drawings are not intended to reflect any real proportion, but only intended to illustrate the content of the disclosure.

Figure 2:
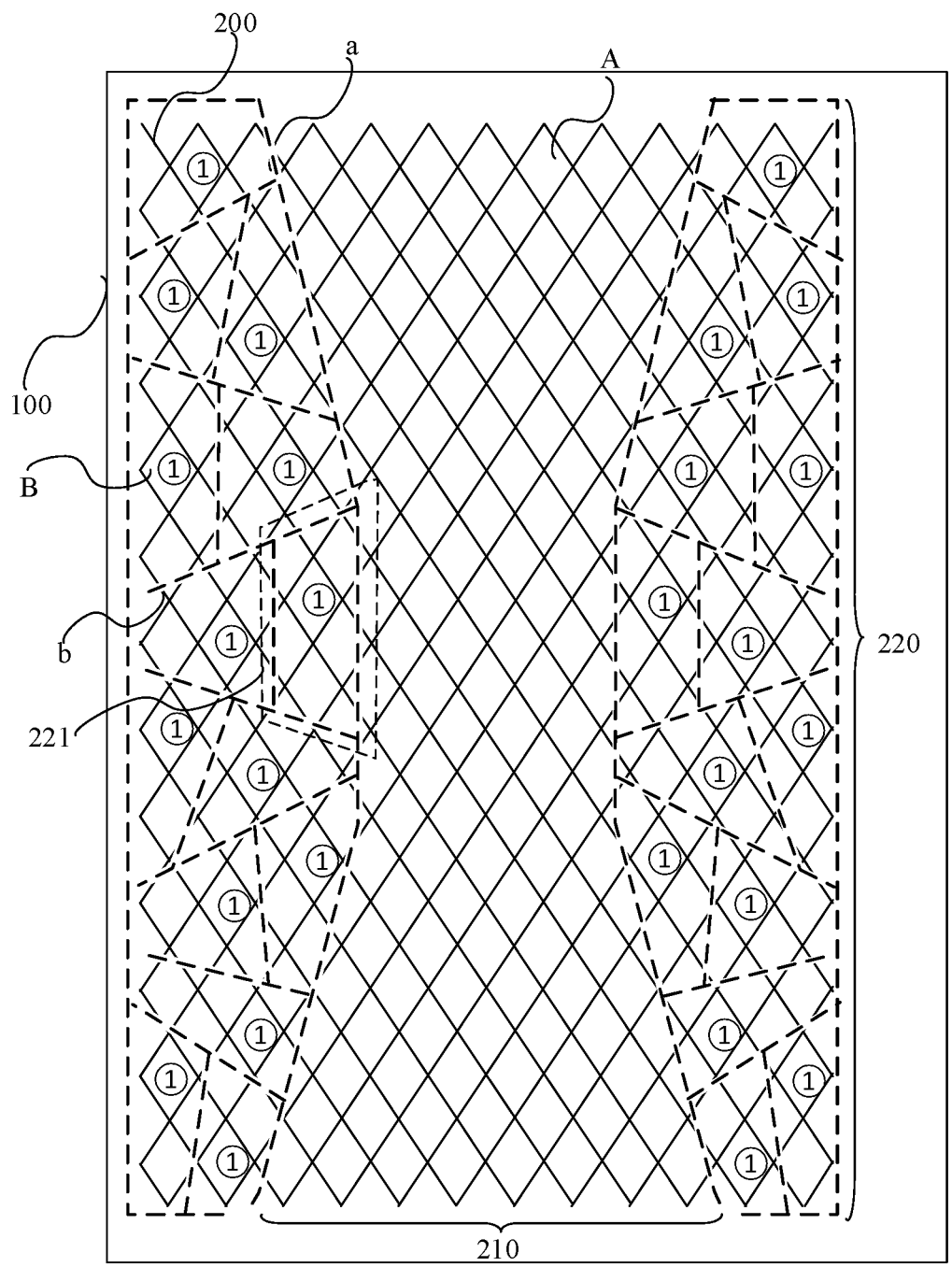
FIG. 2 is a schematic structural diagram of a conductive layer in a touch screen according to an embodiment of the disclosure.
Figure 3:
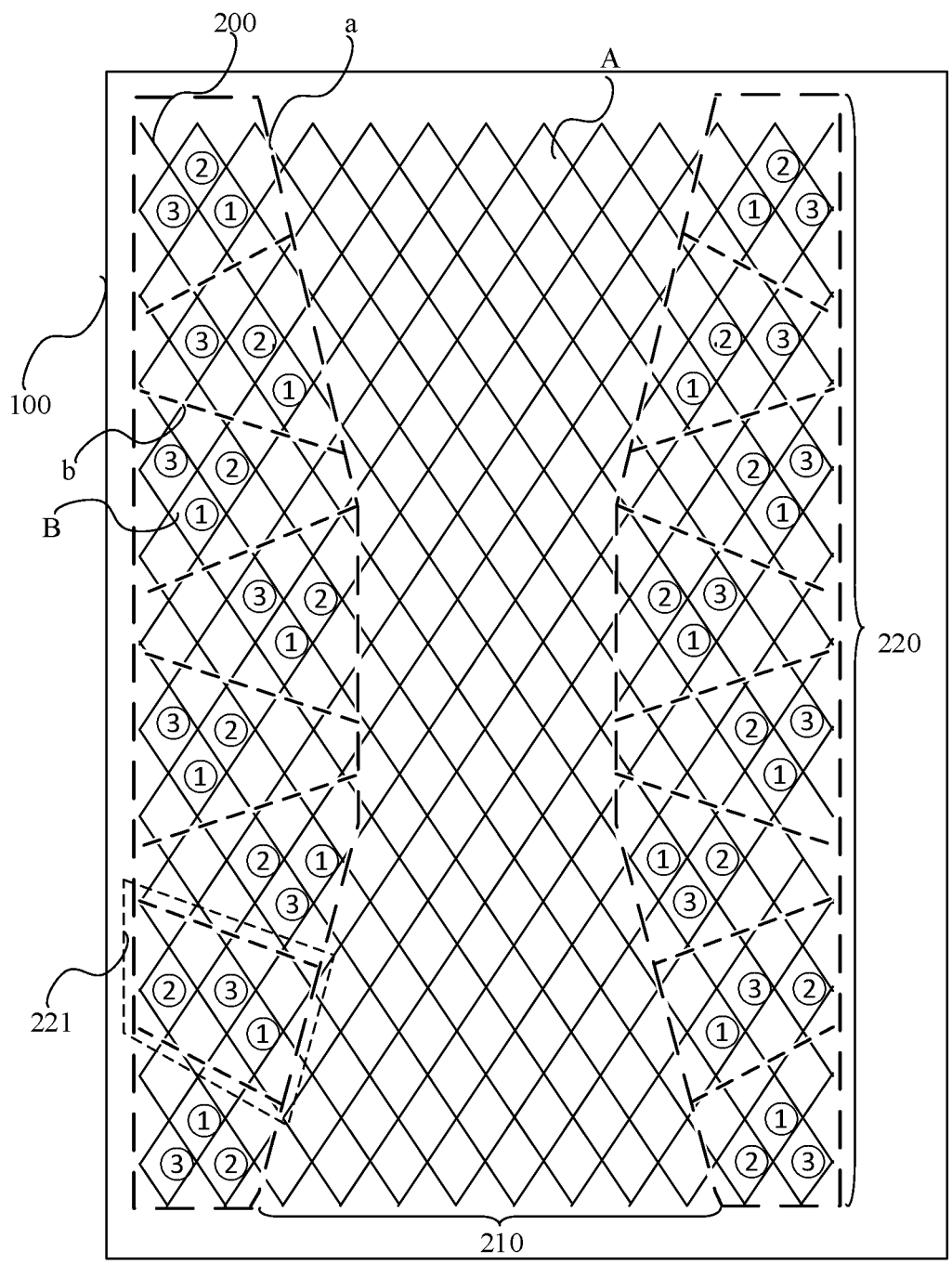
FIG. 3 is another schematic structural diagram of the conductive layer in the touch screen according to the embodiment of the disclosure.

As illustrated in FIG. 2 and FIG. 3, a touch screen according to an embodiment of the disclosure includes: a base substrate 100, and a conductive layer 200 over the base substrate 100.

The conductive layer 200 includes: touch electrodes 210 having a metal mesh, and dummy patterns 220 having a metal mesh, where the touch electrodes 210 are insulated from the dummy patterns 220, and the metal mesh of each of the touch electrodes 210 includes a plurality of closed patterns A.

Each of the dummy patterns 220 includes at least one dummy sub-pattern 221, the at least one dummy sub-pattern 221 is insulated from each other, and the metal mesh of each of the sub-patterns 221 includes at least one closed pattern B.

Specifically in the touch screen above according to the embodiment of the disclosure, an integral metal mesh is segmented into the patterns of the touch electrodes 210 and the dummy patterns 220 of the conductive layer 200, so that the touch electrodes 210 are insulated from the dummy patterns 220 by disconnecting the metal mesh at the edges of the touch electrodes 210 and the edges of the dummy patterns 220. Alike the respective dummy sub-patterns 221 are insulated from each other by disconnecting the metal mesh at the edges of the respective dummy sub-patterns 221.

It shall be noted that in FIG. 1A, FIG. 2, and FIG. 3, for the sake of a convenient illustration, the metal mesh is disconnected at the edges of the touch electrodes 210 and the edges of the dummy patterns 220 in the disconnected state a as denoted in a dotted line, and disconnected at the edges of the respective dummy sub-patterns 221 in the disconnected state b as denoted in a dotted line, that is, the dotted line is a segmentation line, and the metal meshes on two sides of the dotted line are disconnected from each other.

Specifically in the touch screen above according to the embodiment of the disclosure, the dummy patterns 220 substantially include a plurality of dummy sub-patterns 221 to thereby better suppress a signal crosstalk.

Specifically in the touch screen above according to the embodiment of the disclosure, the design of the patterns of the dummy sub-patterns 221 is modified so that the metal mesh of each of the dummy sub-patterns 221 includes at least one closed pattern B, where there are closed patterns B in the dummy patterns 220 instead of no closed pattern B to match with the plurality of closed patterns A in the metal mesh of the touch electrodes 210, to thereby reduce a difference in stay time for etchant in the dummy patterns 220 and the touch electrodes 210 so as to reduce a difference in etching between them, so that there are substantially uniform line widths of the meshes in the dummy patterns 220 and the touch electrodes 210 to thereby guarantee the same optical uniformity in two areas of the dummy patterns 220 and the touch electrodes 210 so as to avoid an optical spot.

In some embodiments, in the touch screen above according to the embodiment of the disclosure, as illustrated in FIG. 2 and FIG. 3, the metal mesh of each of the dummy sub-patterns 221 can include the same number of closed patterns B. Furthermore the metal mesh of each of the dummy sub-patterns 221 includes about one to three closed patterns. Herein, the metal mesh of each of the dummy sub-patterns 221 may include one, two, three, four, etc. closed patterns, the number of the closed patterns in each dummy sub-pattern 221 is not limited thereto.

Specifically FIG. 2 illustrates that the metal mesh of each of the dummy sub-patterns 221 includes one closed pattern B by way of an example, where ① represents a closed pattern. FIG. 3 illustrates that the metal mesh of each of the dummy sub-patterns 221 includes more than one closed pattern B, e.g., three closed patterns B, by way of an example, where ①, ②, and ③ represent closed patterns. In order to design the dummy sub-patterns 221 to include the same number of closed patterns B, the dummy patterns 220 shall be segmented into a plurality of dummy sub-patterns 221 with substantially the same area to thereby facilitate a pattern design, and also suppress signal interference between the dummy sub-patterns 221.

Figure 4A:
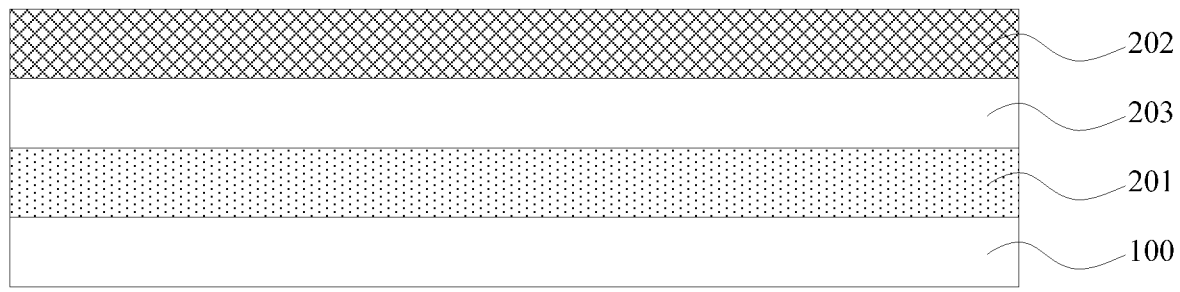
FIG. 4A is a side view of the touch screen according to the embodiment of the disclosure.
Figure 4B:
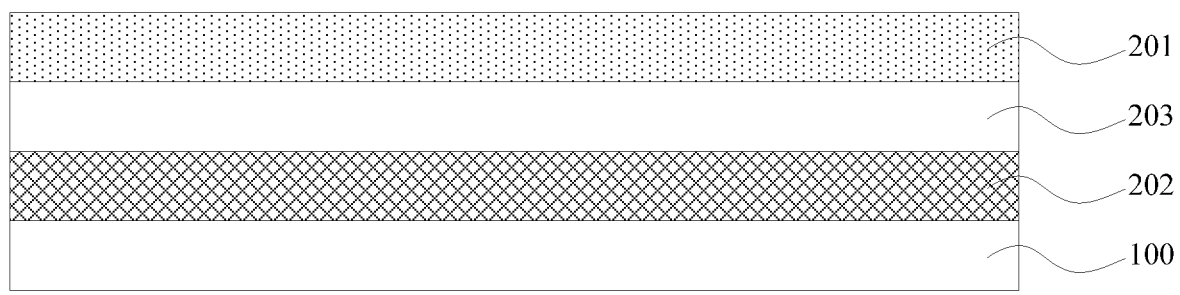
FIG. 4B is another side view of the touch screen according to the embodiment of the disclosure.

In some embodiments, in the touch screen above according to the embodiment of the disclosure, the pattern of the conductive layer 200 can be designed in a number of implementations dependent upon a touch electrode structure in use. For example, as illustrated in FIG. 4A and FIG. 4B, the conductive layer 200 can include a first conductive layer 201 located at the light incident side of the touch screen, and a second conductive layer 202 located at the light emitting side of the touch screen, where an insulation layer 203 is located between the first conductive layer 201 and the second conductive layer 202. The metal mesh of each of the first conductive layer 201 and the second conductive layer 202 can be referenced to the design of metal mesh of FIGS. 2 and 3, a repeated description thereof will be omitted here.

Figure 4C:
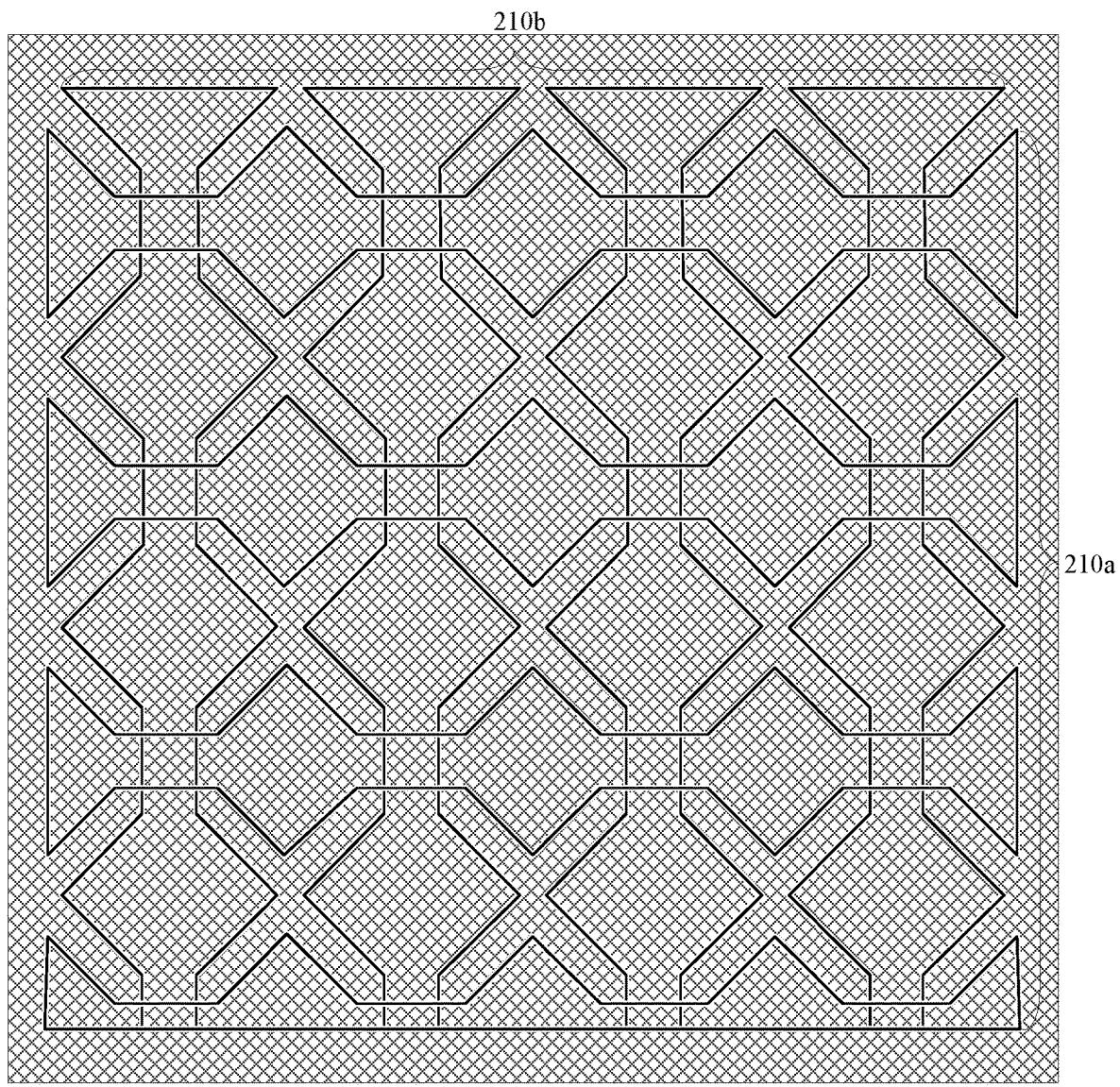
FIG. 4C is a top view of the touch screen according to the embodiment of the disclosure.

As illustrated in FIG. 4C, the touch electrodes 210 in the first conductive layer 201 are touch driving electrodes 210a extending in a first direction, and the touch electrodes 210 in the second conductive layer 202 are touch sensing electrodes 210b extending in a second direction, where the first direction intersects with the second direction, and for example, the first direction can be perpendicular to the second direction. The dummy patterns are not illustrated in FIG. 4C.

Specifically in the touch screen above according to the embodiment of the disclosure, as illustrated in FIG. 4A, when the base substrate 100 side is the light incident side and closer to the display panel, the first conductive layer 201, the insulation layer 203, and the second conductive layer 202 are arranged successively on the base substrate 100; and as illustrated in FIG. 4B, when the base substrate 100 side is the light emitting side and away from the display panel, the second conductive layer 202, the insulation layer 203, and the first conductive layer 201 are arranged successively on the base substrate 100. Furthermore the touch screen can further include black matrixes, a protection layer, and other layers, and a detailed description thereof will be omitted here. In short, the touch driving electrodes are closer to the display panel than the touch sensing electrodes.

Figure 5:
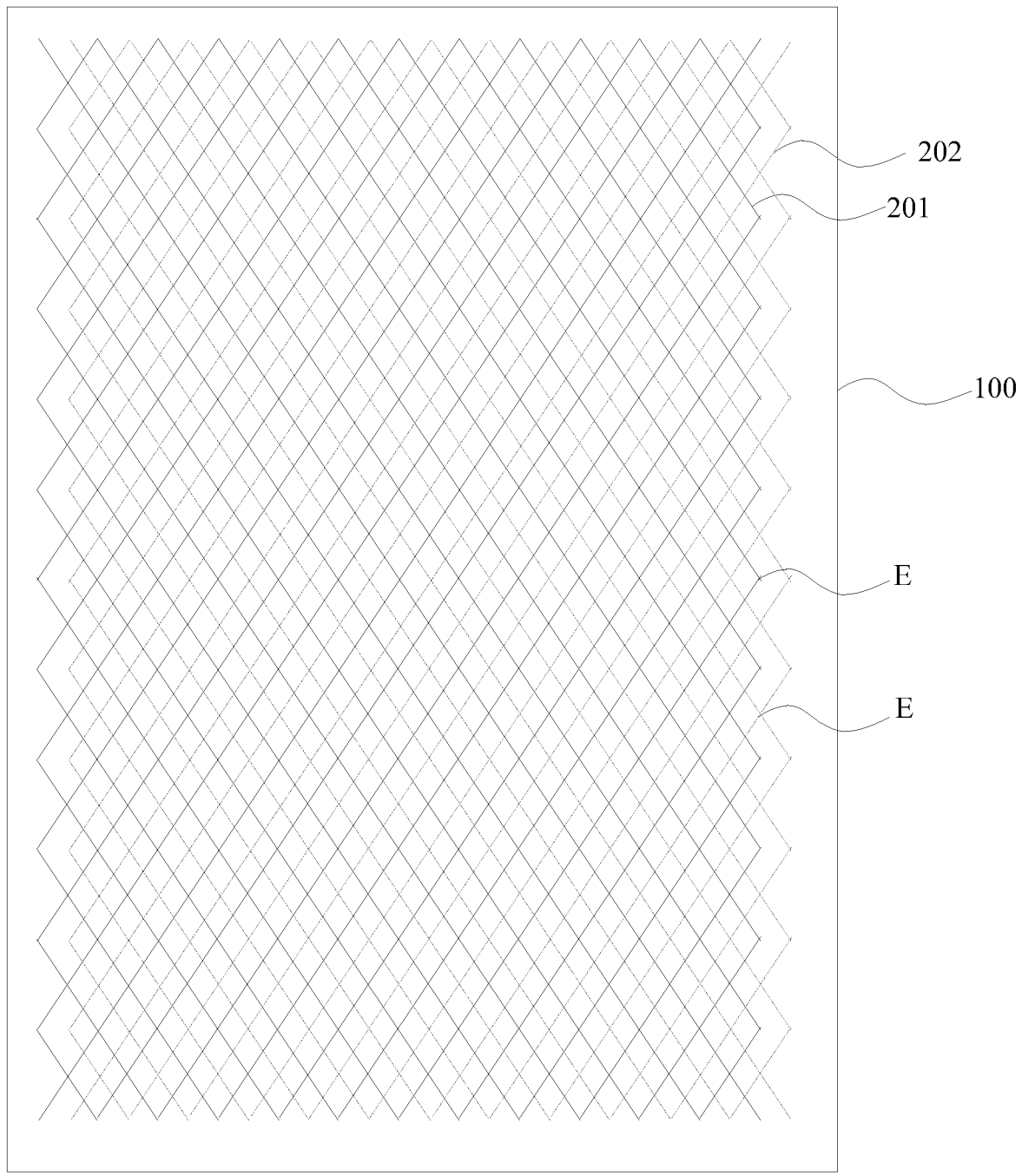
FIG. 5 is a top view of two conductive layers in the touch screen according to the embodiment of the disclosure.

In some embodiments, in the touch screen above according to the embodiment of the disclosure, as illustrated in FIG. 5, the orthographic projection of the metal mesh of the first conductive layer 201, and the orthographic projection of the metal mesh of the second conductive layer 202 onto the base substrate 100 can be offset from each other.

Specifically the metal mesh includes a plurality of diamond meshes, for example, where the metal mesh can be regarded as including a plurality of parallel first mesh lines extending in a third direction, and a plurality of parallel second mesh lines extending in a fourth direction, and the third direction intersects with the fourth direction. The metal mesh of the first conductive layer 201, and the metal mesh of the second conductive layer 202 are arranged to be offset from each other, so that the first mesh lines in the first conductive layer 201 and the first mesh lines in the second conductive layer 202 do not overlap with each other, and/or the second mesh lines in the first conductive layer 201 and the second mesh lines the second conductive layer 202 do not overlap with each other. The metal mesh of the first conductive layer 201 and the second conductive layer 202 are arranged to be offset from each other to thereby avoid an influence of an error in alignment while the touch screen is being manufactured. Furthermore for the sake of a convenient illustration, only the patterns of the metal mesh of the first conductive layer 201 and the second conductive layer 202 are illustrated in FIG. 5.

In some embodiments, in the touch screen above according to the embodiment of the disclosure, as illustrated in FIG. 5, orthographic projections of mesh points E of the metal mesh of the first conductive layer 201, and orthographic projections of mesh points E of the metal mesh of the second conductive layer 202 onto the base substrate 100 can be offset from each other. The mesh point refers to the intersection point of two mesh lines.

Specifically the mesh points E of the metal mesh of the first conductive layer 201, and the mesh points E of the metal mesh of the second conductive layer 202 are offset from each other, so that the first mesh lines of the first conductive layer 201 and first mesh lines of the second conductive layer 202 do not overlap with each other, and the second mesh lines of the first conductive layer 201 and the second mesh lines of the second conductive layer 202 do not overlap with each other. Furthermore the mesh points E of the metal mesh of the first conductive layer 201 can be arranged at the center of the metal mesh of the second conductive layer 202, that is, the metal mesh of the first conductive layer 201 and the second conductive layer 202 can be offset from each other by half one mesh in respective directions.

In some embodiments, in the touch screen above according to the embodiment of the disclosure, as illustrated in FIG. 5, the metal mesh of the first conductive layer 201, and the metal mesh of the second conductive layer 202 can be in the same shape, and of the same size.

Specifically the patterns of the first conductive layer 201 and the second conductive layer 202 are designed as a mesh structure with the same size and shape to thereby simplify a pattern design.

Figure 6:
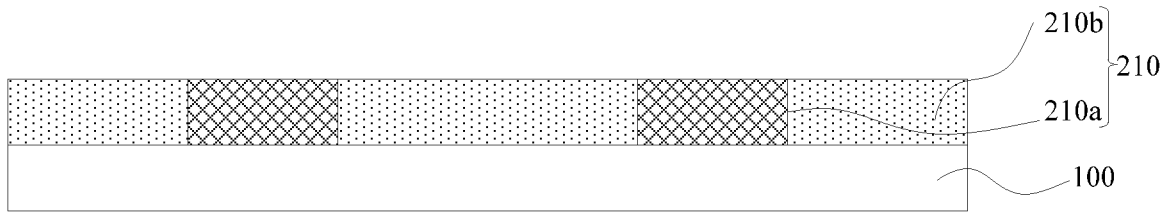
FIG. 6 is another side view of the touch screen according to the embodiment of the disclosure.
Figure 7:
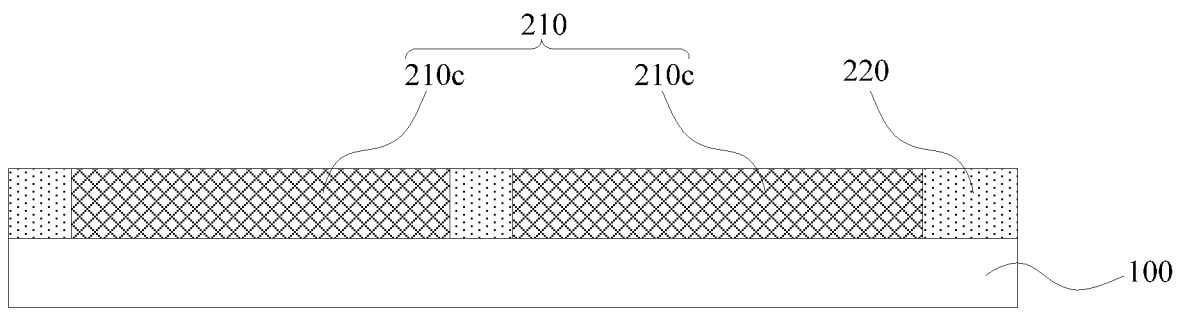
FIG. 7 is another side view of the touch screen according to the embodiment of the disclosure.

In some embodiments, in the touch screen above according to the embodiment of the disclosure, the conductive layer 200 can alternatively be a single layer; and in this manner, when it is designed in a mutual-capacitive mode, then as illustrated in FIG. 6, the touch electrodes 210 may include touch sensing electrodes 210b and touch driving electrodes 210a, and intersections between the touch sensing electrodes 210b and the touch driving electrodes 210a may be further designed in a bridge structure; or, when the conductive layer is designed in a self-capacitive mode, then as illustrated in FIG. 7, the touch electrodes 210 may include self-capacitive electrodes 210c.

Specifically in the touch screen above according to the embodiment of the disclosure, the outer contours of the touch driving electrodes 210a and the touch sensing electrodes 210b can include a plurality of diamond blocks connected together, or can be of other shape, although the embodiment of the disclosure will not be limited thereto. Furthermore in the touch screen above according to the embodiment of the disclosure, the metal mesh has been described as including a plurality of diamond meshes by way of an example, but the shape of the mesh can alternatively include a plurality of hexagons, triangles, or other shapes.

Figure 8:
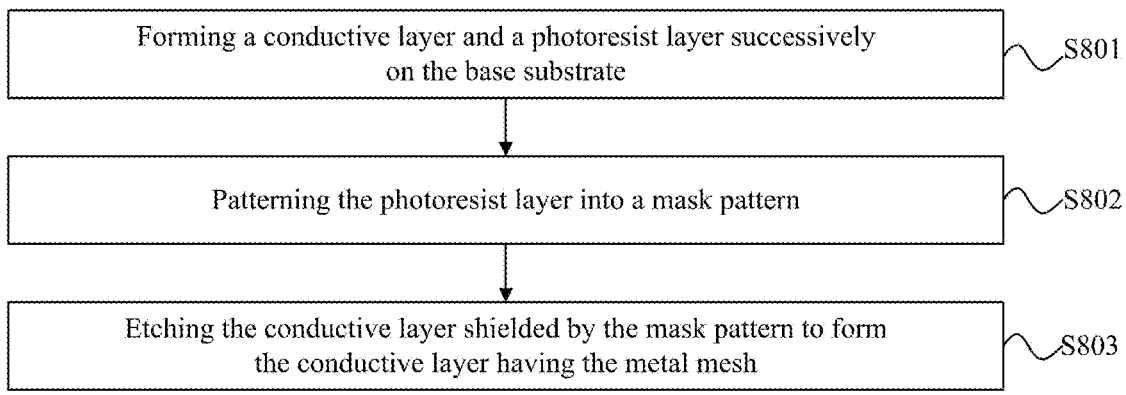
FIG. 8 is a flow chart of a method for manufacturing the touch screen according to the embodiment of the disclosure.

Based upon the same inventive idea, an embodiment of the disclosure further provides a method for manufacturing the touch screen above according to the embodiment of the disclosure, and as illustrated in FIG. 8, the method includes the following steps.

The step S801 is to form the conductive layer and a photoresist layer successively on the base substrate.

The step S802 is to pattern the photoresist layer into a mask pattern.

The step S803 is to etch the conductive layer shielded by the mask pattern to form the conductive layer having a metal mesh.

Specifically the touch screen above according to the embodiment of the disclosure is designed so that the metal mesh of the respective dummy sub-patterns includes at least one closed pattern instead of no closed pattern, to match with the plurality of closed patterns in the metal mesh of the respective touch electrodes, to thereby reduce a difference in time for etching liquid to stay in the dummy patterns and the touch electrodes in the step S803 and to reduce a difference in etching between them, so that there are substantially uniform line widths of the meshes in the dummy patterns and the touch electrodes to thereby guarantee the same optical uniformity in two areas of the dummy patterns and the touch electrodes so as to avoid an optical spot.

The manufacturing method above according to the embodiment of the disclosure will be described below in details taking as an example the structure of the conductive layer in two layers as illustrated in FIG. 4A, where the method specifically includes the following steps.

(1) A Black Matrix (BM) layer is fabricated on the base substrate, where the coating, exposing, and developing photoresist are performed to form a desirable pattern of the BM layer.

(2) The first conductive layer is fabricated, firstly a metal layer is plated, and then coating, exposing, developing, and etching photoresist are performed to form a desirable pattern of the metal mesh of the first conductive layer, where the metal mesh is disconnected at the edges of the touch sensing electrodes and the dummy patterns, and includes a closed pattern in both the touch sensing electrodes and the dummy sub-patterns.

(3) An insulation layer (an OC1 layer) is fabricated, wherein coating, exposing, and developing photoresist are performed to form a desirable pattern of the insulation layer.

(4) The second conductive layer is fabricated, where firstly a metal layer is plated, and then coating, exposing, developing, and etching photoresist are performed to form a desirable pattern of the metal mesh of the second conductive layer, the metal mesh is disconnected at the edges of the touch sensing electrodes and the dummy patterns, and includes a closed pattern in both the touch sensing electrodes and the dummy sub-patterns.

(5) A protection layer (an OC2 layer) is fabricated, where coating, exposing, and developing photoresist are performed to form a desirable pattern of the protection layer.

Figure 9:
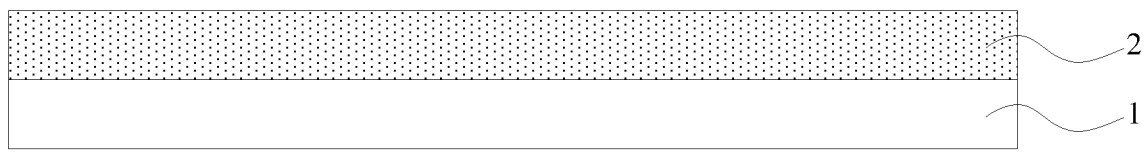
FIG. 9 is a schematic structural diagram of a touch display panel according to an embodiment of the disclosure.

Based upon the same inventive idea, an embodiment of the disclosure further provides a touch display panel as illustrated in FIG. 9 including: a display panel 1, and the touch screen 2 above according to the embodiment of the disclosure. The touch screen 2 is located on the light emitting surface of the display panel 1.

In some embodiments, in the touch display panel above according to the embodiment of the disclosure, the display panel 1 can be a light-emitting display panel or a liquid crystal display panel, although the embodiment of the disclosure will not be limited thereto.

Based upon the same inventive idea, an embodiment of the disclosure further provides a display device including the touch display panel according to any one of the embodiments above of this disclosure. The display device can be a mobile phone, a tablet computer, a TV set, a display, a notebook computer, a digital photo frame, a navigator, or any other product or component with a display function. Reference can be made to the embodiment of the touch display panel above for an implementation of the display device, and a repeated description thereof will be omitted here.

In the touch screen, the manufacturing method thereof, the touch display panel, and the display device above according to the embodiments of the disclosure, the design of the patterns of the dummy sub-patterns is modified so that the metal mesh of the respective dummy sub-patterns includes at least one closed pattern, where there are closed patterns in the dummy patterns instead of no closed pattern to match with the plurality of closed patterns in the metal mesh of the respective touch electrodes to thereby reduce a difference in stay time for etchant in the dummy patterns and the touch electrodes so as to reduce a difference in etching between them, so that there are substantially uniform line widths of the meshes in the dummy patterns and the touch electrodes to thereby guarantee the same optical uniformity in two areas of the dummy patterns and the touch electrodes so as to avoid an optical spot.

Evidently those skilled in the art can make various modifications and variations to the disclosure without departing from the spirit and scope of this disclosure. Thus the disclosure is also intended to encompass these modifications and variations thereto so long as the modifications and variations come into the scope of the claims appended to the disclosure and their equivalents.

The invention claimed is:

1. A touch screen, comprising:
a base substrate, and
a conductive layer over the base substrate, wherein:
the conductive layer comprises: touch electrodes having a metal mesh, and dummy patterns having a metal mesh, wherein the touch electrodes are insulated from the dummy patterns, and the metal mesh of each of the touch electrodes comprises a plurality of closed patterns; and
each of the dummy patterns comprises a plurality of dummy sub-patterns, the plurality of dummy sub-patterns are insulated from each other, and the metal mesh of each of the plurality of dummy sub-patterns is provided with one to three closed patterns and at least one disconnected pattern;
wherein the metal mesh of each of the plurality of dummy sub-patterns comprises the same number of closed patterns;
wherein the metal mesh is disconnected at edges of each of the plurality of dummy sub-patterns;
wherein the conductive layer comprises a first conductive layer located at a light incident side of the touch screen, and a second conductive layer located at a light emitting side of the touch screen;
wherein an orthographic projection of the metal mesh of the first conductive layer and an orthographic projection of the metal mesh of the second conductive layer onto the base substrate are offset from each other;
wherein orthographic projections of mesh points of the metal mesh of the first conductive layer and orthographic projections of mesh points of the metal mesh of the second conductive layer onto the base substrate are offset from each other;
wherein the metal mesh of the first conductive layer and the metal mesh of the second conductive layer are in the same shape, and of the same size;
wherein the orthographic projections of the mesh points of the metal mesh of the first conductive layer are arranged at corresponding centers of the orthographic projections of the mesh points of the metal mesh of the second conductive layer.

2. The touch screen according to claim 1, wherein the metal mesh is disconnected at edges of the touch electrodes and edges of the dummy patterns.

3. The touch screen according to claim 1, wherein an insulation layer is located between the first conductive layer and the second conductive layer; and
the touch electrodes of the first conductive layer are touch driving electrodes extending in a first direction, and the touch electrodes of the second conductive layer are touch sensing electrodes extending in a second direction, wherein the first direction intersects with the second direction.

4. A touch display panel, comprising: a display panel and the touch screen according to claim 1, the touch screen being located on a light emitting surface of the display panel.

5. The touch display panel according to claim 4, wherein the display panel is a light-emitting display panel or a liquid crystal display panel.

6. A display device, comprising the touch display panel according to claim 4.

7. A method for manufacturing the touch screen according to claim 1, comprising:
forming the first conductive layer, an insulation layer, and the second conductive layer successively on the base substrate; or
forming the second conductive layer, an insulation layer, and the first conductive layer successively on the base substrate;
wherein the forming the first conductive layer or forming the second conductive layer comprises:
forming a conductive film layer and a photoresist layer;
patterning the photoresist layer into a mask pattern; and
etching the conductive film layer shielded by the mask pattern to form the first conductive layer or the second conductive layer.

* * * * *